US011039595B2

(12) United States Patent
Boffelli et al.

(10) Patent No.: US 11,039,595 B2
(45) Date of Patent: Jun. 22, 2021

(54) METHOD AND PLANT FOR PROCESSING STRETCHED-CURD CHEESES AND CORRESPONDING FORMING MACHINE

(71) Applicant: Egidio Galbani S.r.l., Milan (IT)

(72) Inventors: Giuliano Boffelli, Milan (IT); Marcello Toma, Milan (IT)

(73) Assignee: EGIDIO GALBANI S.R.L., Milan (IT)

(*) Notice: Subject to any disclaimer, the term of this patent is extended or adjusted under 35 U.S.C. 154(b) by 304 days.

(21) Appl. No.: 16/098,610

(22) PCT Filed: May 3, 2017

(86) PCT No.: PCT/EP2017/060577
§ 371 (c)(1),
(2) Date: Nov. 2, 2018

(87) PCT Pub. No.: WO2017/191217
PCT Pub. Date: Nov. 9, 2017

(65) Prior Publication Data
US 2019/0141944 A1  May 16, 2019

(30) Foreign Application Priority Data
May 3, 2016  (IT) .................. 102016000045028

(51) Int. Cl.
*A01J 25/00* (2006.01)
*A01J 25/12* (2006.01)
(52) U.S. Cl.
CPC ............. *A01J 25/008* (2013.01); *A01J 25/12* (2013.01)
(58) Field of Classification Search
CPC .. A01J 19/00; A01J 21/00; A01J 23/00; A01J 25/00; A23C 19/00; A23C 7/02; A23P 30/20
(Continued)

(56) References Cited

U.S. PATENT DOCUMENTS 4,664,613 A * 5/1987 Tomatis ............... A01J 25/008
249/120
5,505,608 A * 4/1996 Tomatis ............... A01J 25/008
425/261
2002/0012731 A1* 1/2002 van Esbroeck ...... A22C 7/0038
426/512

FOREIGN PATENT DOCUMENTS

DE      1966433 A1   5/1973
DE  102004029408 A1   3/2006
(Continued)

OTHER PUBLICATIONS

Int'l Search Report and Written Opinion dated Jul. 7, 2017 in Int'l Application No. PCT/EP2017/060577.

*Primary Examiner* — Ibrahime A Abraham
*Assistant Examiner* — Simpson A Chen
(74) *Attorney, Agent, or Firm* — Panitch Schwarze Belisario & Nadel LLP

(57) ABSTRACT

Forming machine to process stretched-curd cheeses including a frame to support feed device of stretched curd toward a forming roll having a plurality of cavities on its lateral surface, which are able to house respective portions of stretched curd, and associated with motor to drive the roll in rotation around its longitudinal axis, during the rotation of the forming roll each row of cavities being able to transit through at least an angular loading position and an angular unloading position, and separation device also being provided, interposed between the feed device and the forming roll in correspondence with the angular loading position in order to cut the portions of stretched curd housed inside the cavities from the remaining mass of stretched curd during the rotation of the forming roll; the cavities are distributed on a plurality of circumferential lines of the forming roll.

7 Claims, 8 Drawing Sheets

(58) Field of Classification Search
USPC ......... 99/452–454, 460, 464, 489, 494, 516, 99/535
See application file for complete search history.

(56) References Cited

FOREIGN PATENT DOCUMENTS

| | | |
|---|---|---|
| EP | 0625304 A1 | 11/1994 |
| EP | 0727139 A1 | 8/1996 |
| FR | 2145491 A1 | 2/1973 |

\* cited by examiner

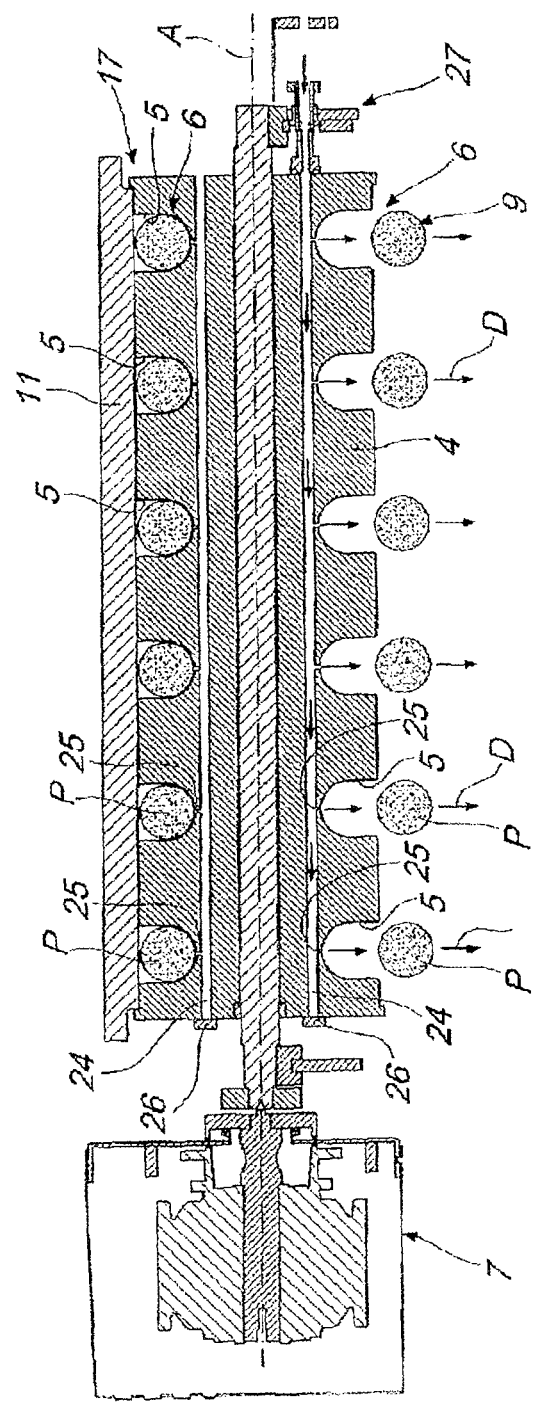

METHOD AND PLANT FOR PROCESSING STRETCHED-CURD CHEESES AND CORRESPONDING FORMING MACHINE

CROSS-REFERENCE TO RELATED APPLICATIONS

This application is a Section 371 of International Application No. PCT/EP2017/060577, filed May 3, 2017, which was published in the English language on Nov. 9, 2017, under International Publication No. WO 2017/191217 A1, which claims priority under 35 U.S.C. § 119(b) to Italian Application No. 102016000045028, filed May 3, 2016, the disclosures of each of which are incorporated herein by reference.

FIELD OF THE INVENTION

The present invention concerns a method and a plant for processing stretched-curd cheeses and a corresponding forming machine.

BACKGROUND OF THE INVENTION

Stretched-curd cheeses are known, such as mozzarellas and suchlike, in which the processing method comprises a step of stretching the melted curd, which is then fed to a forming step to obtain portions of stretched curd with the desired size and shape. After this, there is a step of hardening the stretched curd in a cooling bath and finally a packaging step.

The forming step takes place inside forming machines that receive the stretched curd at entrance and discharge at exit the portions of stretched curd obtained inside the cooling baths.

Forming machines of a known type essentially consist of a frame that supports a hopper that feeds the stretched curd toward the entrance ends of a plurality of feed screws whose corresponding exit ends face a forming roll. The forming roll consists of a cylindrical body provided on a lateral surface with a plurality of cavities with the shape and volume of the portions of stretched curd that are to be obtained. The cavities are distributed staggered on the surface of the roll along respective generating lines in order to optimize the productive capacity of the machine, and the roll is motorized in continuous rotation around its longitudinal axis.

Between the exit mouths of the feed screws and the forming roll an insert is interposed, made of plastic material and having a longitudinal slit facing the exit mouths of the feed screws for the passage of the stretched curd toward the cavities of the roll. The insert has a concave surface positioned tangent to the external surface of the roll which partly surrounds the surface thereof. In the rotation of the roll, portions of stretched curd pressed inside the cavities that gradually face the slit are separated from the remaining mass of curd in correspondence with the edge of the slit. The insert allows to distribute the stretched curd in the cavities, to cut the various portions of curd pressed inside the cavities and allows the rotation of the roll without chafing on the other metal elements of the machine.

When the cavities filled with stretched curd, as they rotate, are positioned in the lower zone of the roll, free of the insert, the portions obtained inside the cooling system are discharged.

Along the rotation arc of the roll inside the insert, jets of water can be provided to cool the roll and the portions of stretched curd contained in the cavities, promoting their detachment from the cavities and the discharge into the cooling tank below.

For small format products, systems can be provided that facilitate discharge from inside the cavities by injecting water.

The hardening system generally provided downstream of the forming machine consists of one or more cooling tanks, mechanized and filled with water at a controlled temperature, or of small carriers, again filled with water, in which the products are moved manually.

It is necessary to control the temperature and to move the water both to maintain the shape of the cheeses obtained, and also for microbiological requirements.

Indeed, during cooling, the products release fat which is dispersed in the water, making it dirty and increasing the bacterial load present therein.

To limit and control the bacterial load, in order to guarantee a certain duration of the products and to prevent contamination, the cooling water has to be replaced gradually and continuously, that is, systems must be used to filter the fat or UV lamps used to disinfect the water.

Furthermore, during cooling, the products can rub and knock against each other or against the metal walls of the tanks or carriers, with the risk of damaging their surfaces, to the extent of becoming unappealing for consumers and of dispersing fragments in the water that can make it even dirtier.

These known production systems are not without disadvantages, including the fact they need to provide additional systems of control, filtering and/or purifying the cooling water, which increase the installation costs of the plants, increase the water consumption and need additional maintenance.

Moreover, in the event of malfunctions, there is always the risk that the product can be contaminated by the bacterial load present in the cooling water, with a consequent risk for the health of consumers and damage to the image of the producers.

Furthermore, the hardening step entails the risk that the products can deteriorate from an esthetic point of view, and become visually unpleasant for consumers. The main purpose of the present invention is to eliminate the disadvantages of the state of the art as described above and to devise a forming machine that guarantees optimum hygiene conditions of the products and an increase in their duration, without requiring the use of systems to control, purify and/or filter the cooling water, thus simplifying the production plants and reducing their installation costs, running costs and maintenance costs.

Within the framework of this purpose, another purpose of the present invention is to prevent the risk of contaminating the cheeses obtained, so as to safeguard consumers' health and to prevent damage to the image of producers.

Another purpose of the present invention is to preserve the integrity of the cheeses obtained and not to compromise the esthetic characteristics appreciated by consumers.

Another purpose of the present invention is not to penalize the productivity of the process and to simplify the equipment usually used for the various processing steps, with particular reference to the hardening step.

Finally, another purpose of the present invention is to present a simple structure, relatively easy to actuate in practice, safe to use and effective in functioning, and also at a relatively limited cost.

SUMMARY OF THE INVENTION

These purposes are all obtained by the present forming machine for processing stretched-curd cheeses comprising a frame to support feed means to feed stretched curd toward a forming roll having a plurality of cavities on its lateral surface, which are able to house respective portions of stretched curd and are positioned along a plurality of rows in correspondence with respective generator lines of the roll, and associated with motor means to drive the roll in rotation around its longitudinal axis, during the rotation of the forming roll each row of cavities being able to transit through at least an angular loading position and an angular unloading position, and separation means also being provided, interposed between the feed means and the forming roll in correspondence with the angular loading position in order to cut the portions of stretched curd housed inside the cavities from the remaining mass of stretched curd during the rotation of the forming roll, characterized in that said cavities are distributed on a plurality of circumferential lines of said forming roll so that each of said rows of cavities has one cavity disposed in correspondence with each of said circumferential lines, and in that said separation means comprise a partition with an aperture for the passage of the stretched curd from said feed means toward said forming roll in correspondence with each of said circumferential lines.

BRIEF DESCRIPTION OF THE DRAWINGS

Other characteristics and advantages of the present invention will become more apparent from the detailed description of a preferential but non-restrictive embodiment of a method and plant for processing stretched-curd cheeses, and also the corresponding forming machine, shown by way of non-restrictive example in the attached drawings where:

FIG. 9 is a section view according to the section plane IX-IX of FIG. 7.

DETAILED DESCRIPTION OF SOME EMBODIMENTS

Figure 1:
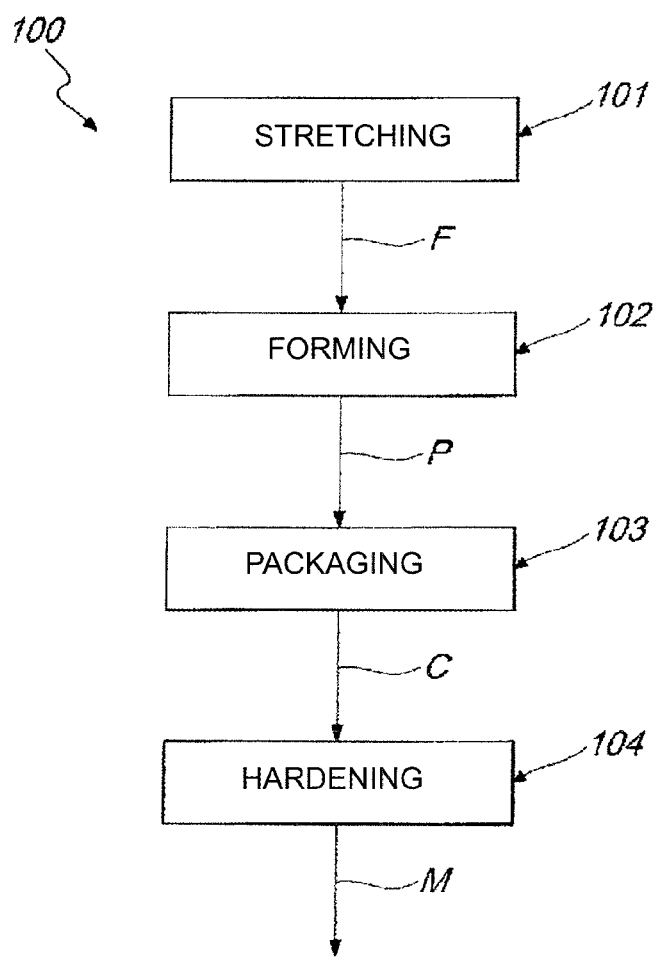
FIG. 1 is a flow chart that shows the steps of a method to process stretched-curd cheeses according to the invention.
Figure 2:
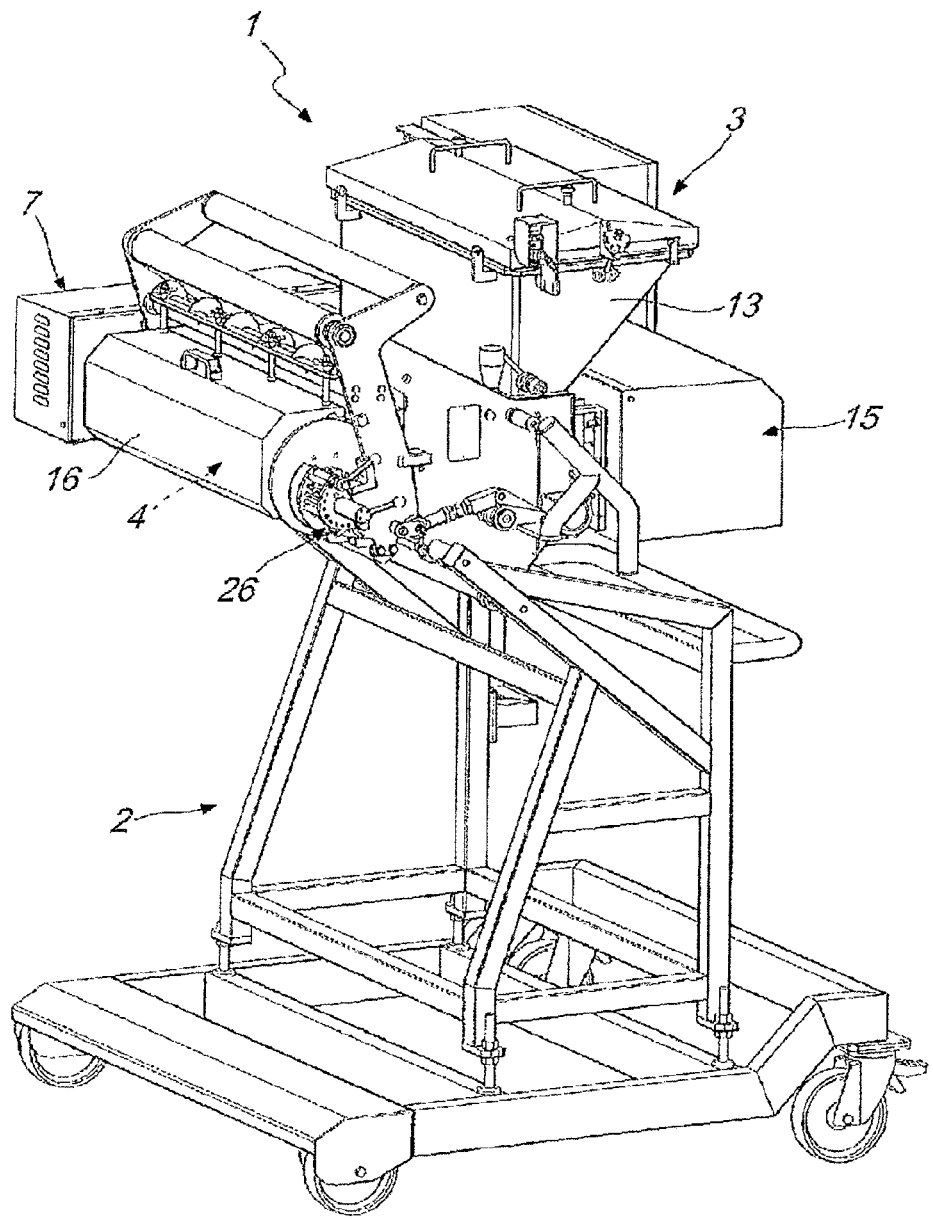
FIG. 2 is a three-dimensional view of a forming machine to process stretched-curd cheeses according to the invention.
Figure 3:
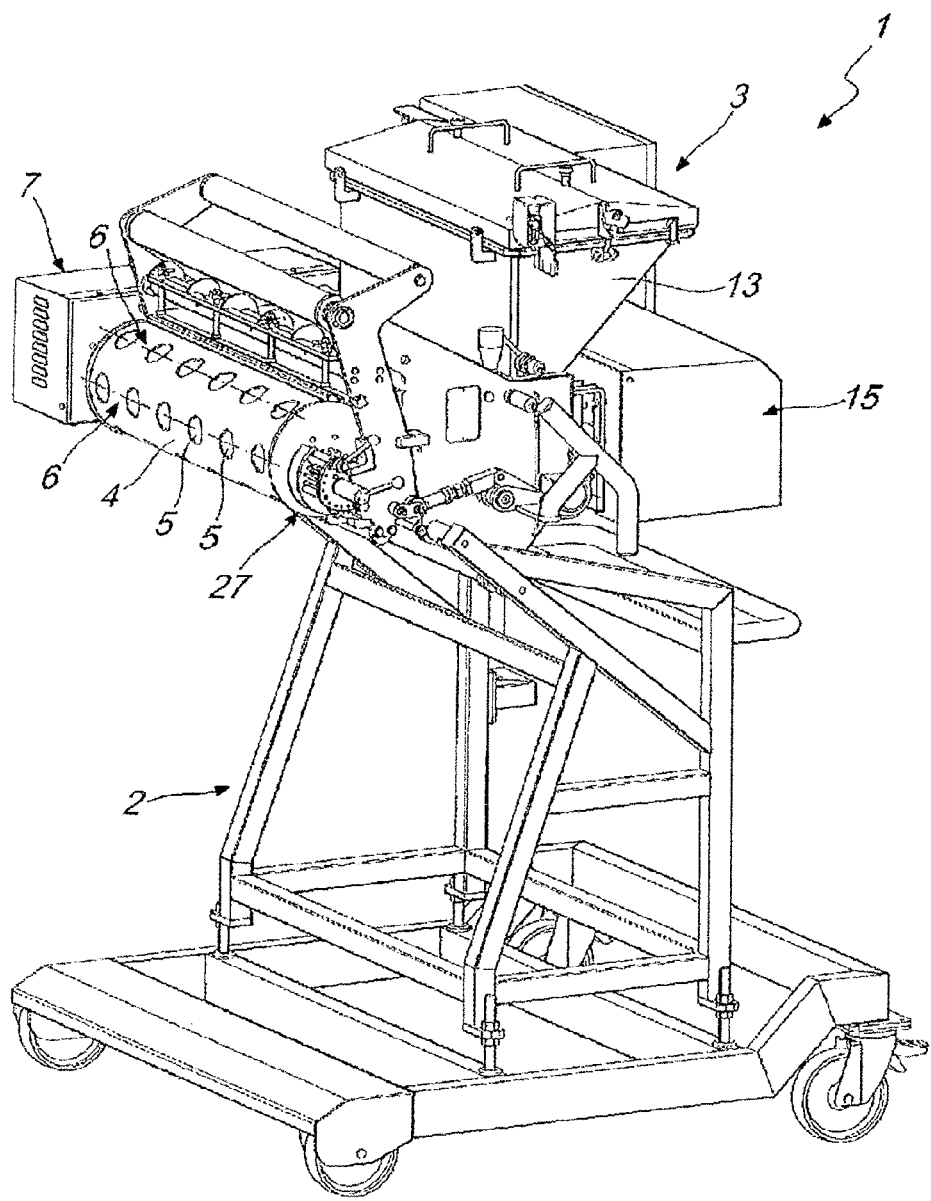
FIG. 3 is a view of the machine in FIG. 2, but with the forming roll uncovered.
Figure 4:
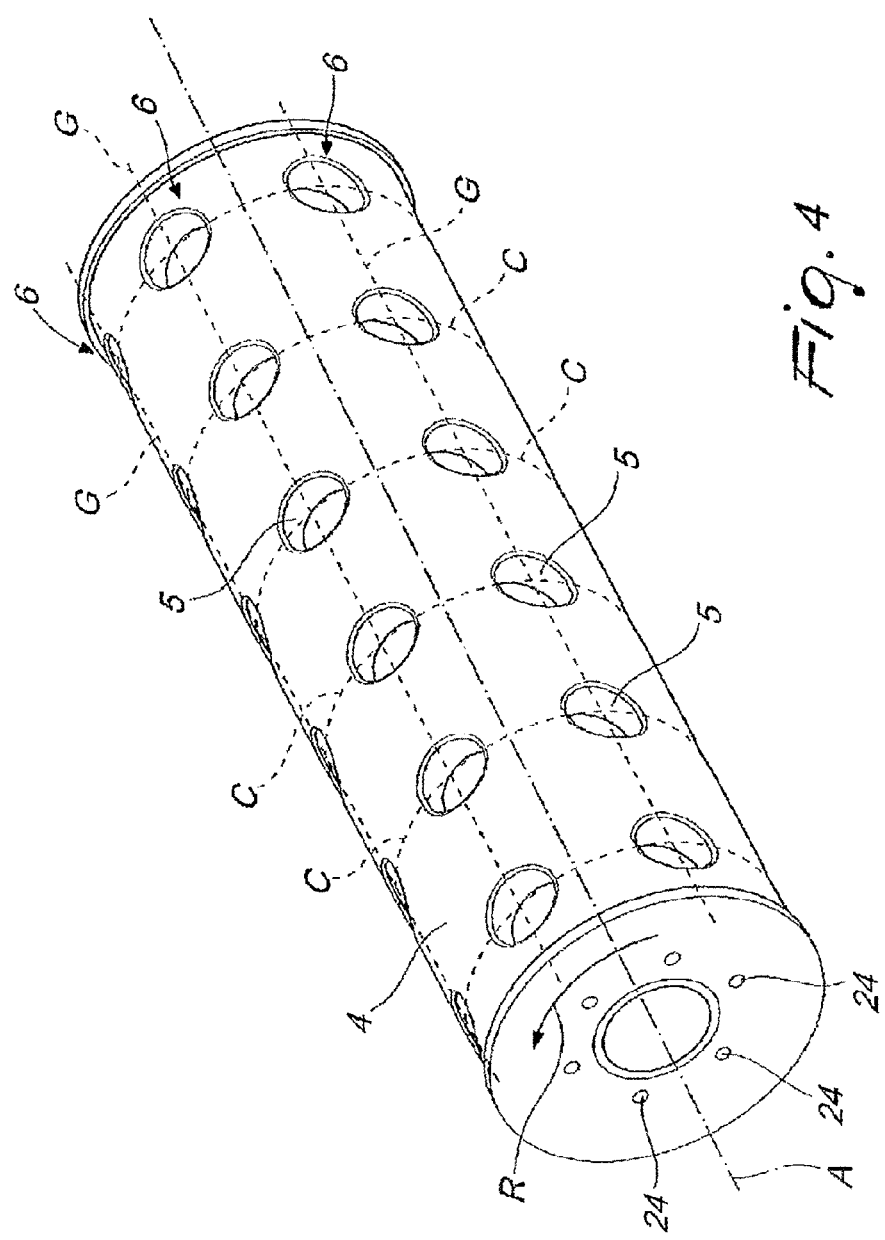
FIG. 4 is a three-dimensional view of the machine in FIG. 2 of the forming roll of the forming machine according to the invention.
Figure 5:
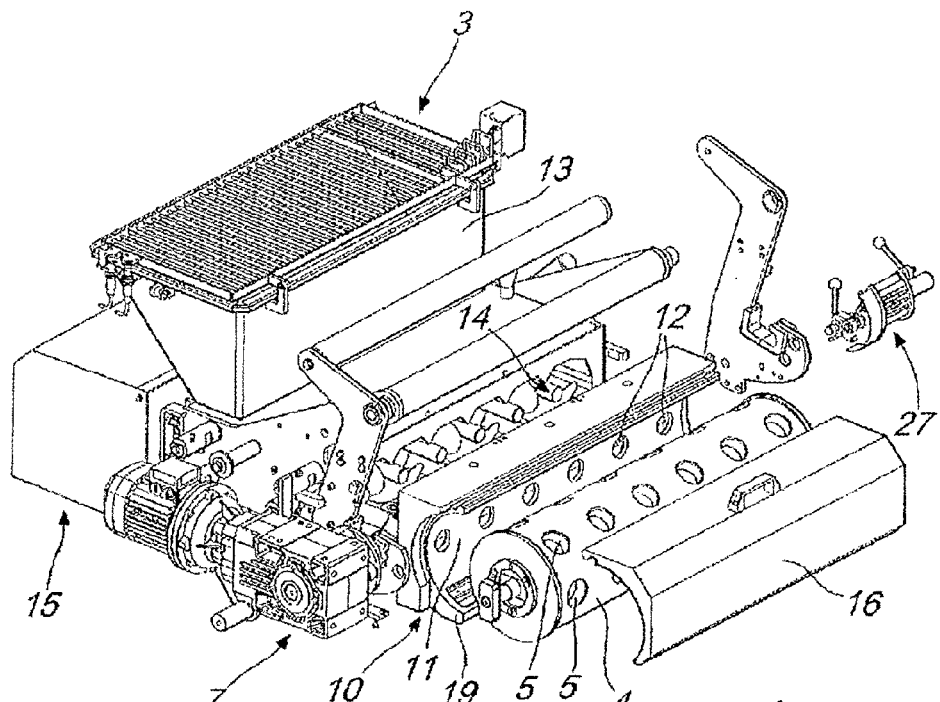
FIG. 5 is an exploded three-dimensional view from in front of the upper portion of the machine in FIG. 2.
Figure 6:
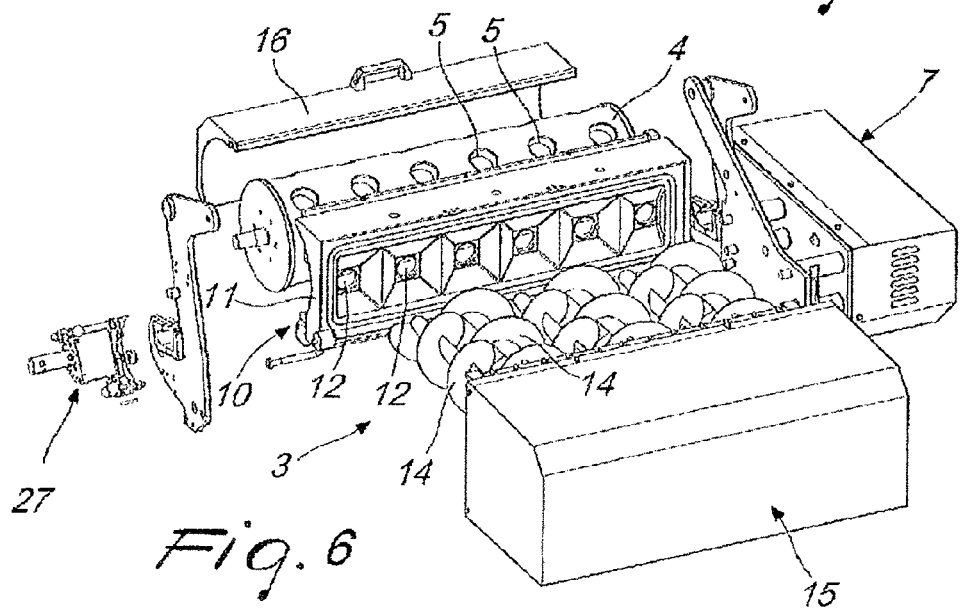
FIG. 6 is an exploded three-dimensional view from behind of the upper portion of the machine in FIG. 2.
Figure 7:
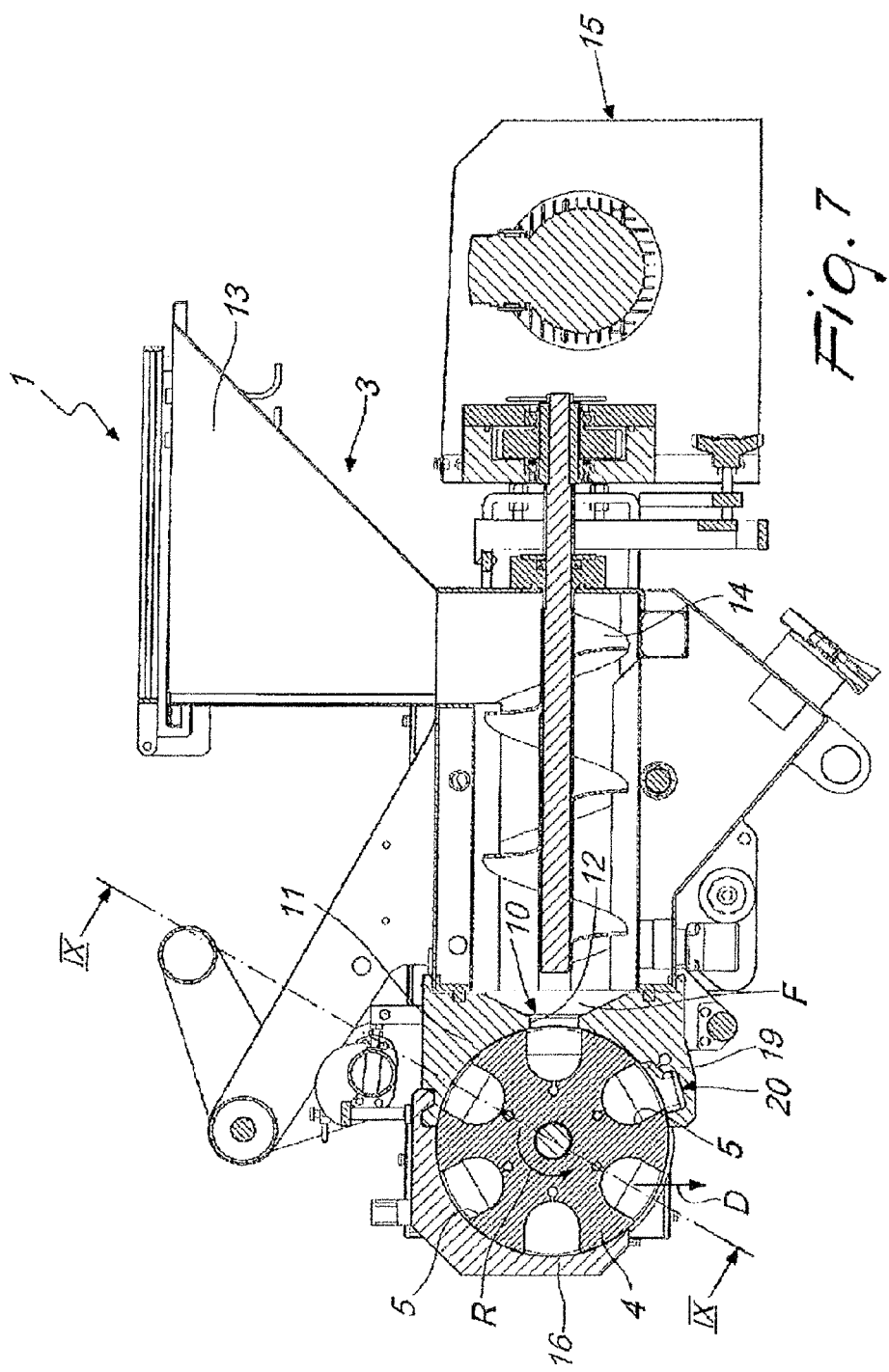
FIG. 7 is a longitudinal section view of the upper portion of the machine in FIG. 2.
Figure 8:
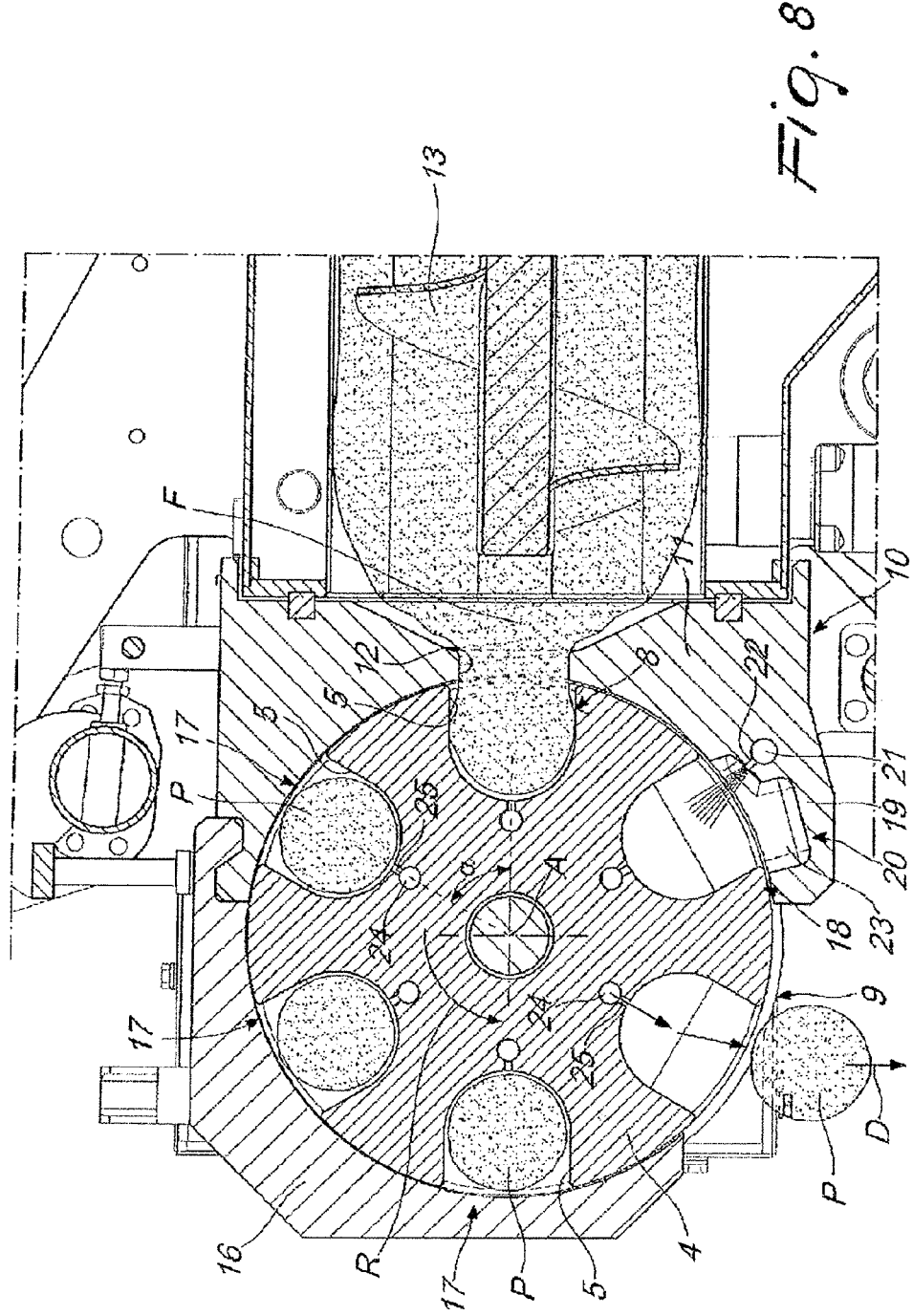
FIG. 8 is a view on an enlarged scale of a portion of FIG. 7.

With particular reference to FIG. 1, a method for processing stretched-curd cheeses is denoted in its entirety by the reference number 100.

The method 100 provides the following sequence of steps:
a step of stretching 101 the melted cheese to obtain stretched curd;
a step of forming 102 the stretched curd F to obtain portions P of stretched curd with predefined shape and weight;
a step of packaging 103 the portions P to obtain packaged portions C; and finally,
a step of hardening 104 the packaged portions C in a bath with a controlled temperature to obtain already packaged cheeses M of stretched curd, such as mozzarellas or suchlike.

We must point out that advantageously the packaging step is provided directly downstream of the forming step, while the hardening step follows the latter. According to the method 100, the possibilities of contaminating the cheeses during the processing step with the cooling liquid are substantially zero, thus optimizing the quality level and increasing the duration of the cheeses before consumption.

Furthermore, in this way the hardening step can be carried out in a bath of liquid (water) at a controlled temperature, but without needing to provide mixing members, since the cheeses being processed are protected inside the package which also contains a certain volume of protective liquid. No less importantly, the cooling liquid does not need particular treatments and/or controls from a microbiological point of view, since it does not enter into direct contact with the product.

The method 100 can be actuated in a plant, not shown here, consisting of a conventional stretching station for obtaining stretched curd F of cheese, a forming station fed with the stretched curd F to obtain portions P of the curd, unloaded directly at entrance to a packaging station downstream of which a hardening station is provided, to obtain already packaged cheeses M.

The stretching and packaging stations are not described in detail here, since they can use conventional stretching machines and packaging machines of a known type.

The hardening station can consist of a bath of cooling liquid (water) at a controlled temperature.

On the contrary, the forming station can provide a forming machine of the type described hereafter.

With particular reference to FIGS. 2-9, a forming machine for processing stretched-curd cheeses according to the invention is denoted in its entirety by the reference number 1.

The machine 1 comprises a frame 2 to support feed means 3 to feed stretched curd F toward a forming roll 4, essentially cylindrical in shape, having a plurality of cavities 5 on its lateral surface, which are able to house respective portions P of stretched curd F.

The cavities 5 have a shape and size substantially corresponding to that of the portions P of stretched curd F to be obtained.

In the embodiment shown, the frame 2 rests on wheels so that it can be moved in the processing plant, but alternative embodiments are not excluded.

The cavities 5 are distributed on the lateral surface of the forming roll 4 along a plurality of rows 6 disposed in correspondence with respective generator lines G of the roll 4, distributed with a constant angular pitch ($\alpha$).

Moreover, the cavities 5 are distributed on a plurality of circumferential lines C of the forming roll 4 so that each row 6 has one cavity 5 in correspondence with each of the circumferential lines C.

In this way the portions P are unloaded in an orderly manner in substantially vertical exit directions D, distributed like the circumferential lines C, and can be sent directly to subsequent processing, for example packaging.

The forming roll 4 is supported by the frame 2 rotating around its longitudinal axis A, and is associated with motor means to drive it in rotation.

During the rotation of the forming roll 4, each row 6 of cavities 5 is able to transit through at least an angular loading position 8 and an angular unloading position 9.

Advantageously, the motor means 7 are the intermittent type, to drive the rotation of the forming roll 4 discontinuously for a circumferential arc equal to the angular pitch ($\alpha$) with which the rows 6 of cavities 5 are distributed.

The machine 1 also provides separation means 10, interposed between the feed means 3 and the forming roll 4, which provide a partition 11, preferably made of plastic material, equipped with a plurality of apertures 12 for the passage of the stretched curd F from the feed means 3 to the cavities 5 of the forming roll 4, each of which is disposed in correspondence with a respective circumferential line C of the roll 4.

The partition 11 has its surface facing toward the forming roll 4 which is concave with a cylindrical shape, so as to partly surround the roll 4.

The feed means 3 provide a hopper 13 to load the stretched curd F in communication with the entrance ends of a plurality of feed screws 14, disposed parallel to each other, each of which has the corresponding exit end facing a corresponding aperture 12 of the partition 11.

Advantageously the feed screws 14 are associated with intermittent drive means 15, not described in detail as they are the conventional type. In this way the feed screws 14 are driven when the forming roll 4 is stationary for filling the row 6 of cavities 5 positioned in correspondence with the angular loading position 8 with respective portions P of stretched curd F, and are deactivated during the rotation of the roll 4 to avoid pressing the stretched curd F against its lateral surface.

The machine 1 comprises an appendix 16 associated with the partition 11 to cover the forming roll 4 between the angular loading position 8 as far as near to the angular unloading position 9 in the direction of rotation R of the roll 4.

In the embodiment shown here, the appendix 16 consists of a sort of lid coupled resting on the partition 11, which has its surface facing the forming roll 4 concave with a cylindrical shape, so as to partly wind on the roll 4.

In the rotation of the forming roll 4, at least three angular transfer positions 17 are provided between the loading position 8 and the unloading position 9 in the direction of rotation R of the roll 4, through which the forming roll 4 transits, being enclosed inside the partition 11 and the appendix 16 to prevent contaminations of the portions P of stretched curd F enclosed in the cavities 5.

Furthermore, an intermediate angular position 18 is provided between the angular loading position 8 and the angular unloading position 9 in the direction of rotation R of the forming roll 4, in correspondence with which a covering flap 19 of the roll 4 is provided, associated with the partition 11. In the embodiment shown here, the flap 19 is defined integral with the partition 11 in a single body, but alternative embodiments are not excluded.

In correspondence with the flap 19, washing means 20 are provided to wash the cavities 5 in transit through the intermediate angular position 18 downstream of the unloading of the portions P of stretched curd F, so as to sanitize and cool the cavities 5 before they are filled again.

The washing means 20 consist of a pipe 21 made inside the flap 19, communicating with a plurality of orifices 22 facing toward the cavities 5 in transit, which is fed with a washing liquid (water, to which a suitable disinfectant has possibly been added) and a longitudinal chamber 23 facing toward the cavities 5 in transit to collect the washing liquid, which is made on the surface of the flap 19 facing the cavities 5 and in communication with an outlet (not shown).

In the embodiment shown here, the forming roll 4 includes six rows 6 comprising six cavities 5 each, which are distributed with an angular pitch ($\alpha$) of 60°. In this case, in the direction of rotation R of the forming roll 4 an angular loading position 8 is provided in correspondence with the apertures 12 of the partition 11, three angular transfer positions 17 in which the forming roll 4 is covered by the partition 11 and the appendix 16, an angular unloading position 9 facing downward and in which the roll 4 is open toward the outside so as to release the portions P of stretched curd F, and an intermediate angular position 18 in correspondence with the flap 19 with the corresponding washing means 20.

Naturally, the number of rows 6 of cavities 5 and the number of cavities 5 for each row 6 can vary depending on the sizes of the portion P to be obtained and on production requirements. Consequently, the number of angular positions in the rotation of the forming roll 4 can also vary, being equal to the number of rows 6. To promote the release of the portions P in correspondence with the angular unloading position 9, the forming roll 4 can be equipped internally with a longitudinal channel 24 in correspondence with each row 6 of cavities 5, which is in communication with a plurality of branches leading into the cavities 5 of the corresponding row 6. The channels 24 are open in correspondence with a first side of the forming roll 4, while they are closed by corresponding caps 26 on the opposite side of the roll 4.

The machine 1 provides suitably filtered compressed air feed means 27, not described in detail as they are the conventional type, which are supported by the frame 2 in correspondence with the first side of the forming roll 4, so as to be alternately in communication with the channel 24 of the row 6 of cavities 5 in transit through the angular unloading position 9.

Every time the forming roll 4 stops moving, the feed means 27 are driven to promote the expulsion of the portions P of stretched curd F contained in the cavities 5 that are in correspondence with the angular unloading position 9.

With reference to one row 6 of cavities 5, the functioning of the present invention is as follows: the stretched curd F introduced into the hopper 13 is transferred by the feed screws 14 toward the forming roll 4.

With the forming roll 4 stationary, from the exit ends of the feed screws 14, through the apertures 12 of the partition 11, the stretched curd F is pressed inside the row 6 of cavities 5 positioned in correspondence with the angular loading position 8. When the forming roll 4 starts rotating again, the stretched curd F collected in the cavities 5 is cut from the remaining mass, rubbing against the upper edge of the apertures 12, so that in each cavity 5 a portion P of stretched curd F remains, with the shape and volume corresponding to that of the cavity 5. In the intermittent rotation of the forming roll 4, the cavities 5 transit through the angular transfer positions 17 until they are positioned in correspondence with the angular unloading position 9 where, due to gravity and with the aid of jets of compressed air exiting from the branches 25, the portions P of stretched curd F are expelled in the respective exit directions D, leaving the cavities 5 free.

With the next step, the cavities 5 find themselves stationary in correspondence with the intermediate angular position 18. The activation of the washing means 20 allows to disinfect and cool the cavities 5 before they are refilled. When the cavities 5 are positioned in correspondence with the angular loading position 8, the cycle described above begins again.

In practice, we have seen how the invention described obtains the proposed purposes, and in particular we emphasize that the forming machine according to the present invention prevents bacterial contamination of the cheeses being processed before packaging takes place, thus increasing their quality and duration before consumption.

In particular, using and activating the washing means 20 allows to advantageously increase the preservability of the final product, and therefore, for example, the package of stretched-curd cheese obtained.

Moreover, the invention allows to preserve the integrity and esthetic attractiveness of the product.

Furthermore, the invention allows to simplify the machinery used, in particular with regard to the hardening step.

Not least, the invention makes it possible to not penalize the production capacity of the process.

The invention thus conceived can be subjected to numerous modifications and variants, all coming within the field of the inventive concept.

Moreover, all the details can be replaced by other, technically equivalent elements.

In practice the materials used, and the contingent shapes and sizes, can be any whatsoever, depending on requirements, without departing from the field of protection of the following claims.

The invention claimed is:

1. A forming machine (1) to process stretched-curd cheeses comprising a frame (2) to support a feed means (3) of stretched curd (F) toward a forming roll (4) having a plurality of cavities (5) on its lateral surface, which are able to house respective portions (P) of stretched curd and are positioned along a plurality of rows (6) in correspondence with respective generator lines (G) of the roll (4), and associated with a motor means (7) to drive the roll (4) in rotation around its longitudinal axis (A), during the rotation of the forming roll (4) each row (6) of cavities being able to transit through at least an angular loading position (8) and an angular unloading position (9), and a separation means (10) also being provided, interposed between the feed means (3) and the forming roll (4) in correspondence with the angular loading position (8) in order to cut the portions (P) of stretched curd housed inside the cavities (5) from the remaining mass of stretched curd (F) during the rotation of the forming roll (4), wherein said cavities (5) are distributed on a plurality of circumferential lines (C) of said forming roll (4) so that each of said rows (6) of cavities has one cavity (5) disposed in correspondence with each of said circumferential lines (C), and wherein said separation means (10) comprise a partition (11) with an aperture (12) for the passage of the stretched curd (F) from said feed means (3) toward said forming roll (4) in correspondence with each of said circumferential lines (C), wherein said forming roll (4) comprises at least one intermediate angular position (18) between said angular loading position (8) and said angular unloading position (9) in a direction of rotation (R) of said forming roll (4), and wherein said forming machine comprises a flap (19) to cover said forming roll (4) in correspondence with said at least one intermediate angular position (18) that is associated with said partition (11), washing means (20) being provided to wash the cavities in transit through the at least one intermediate angular position (18) associated with the flap (19).

2. The forming machine (1) as in claim 1, wherein said rows (6) of cavities are distributed on the lateral surface of said forming roll (4) with a constant angular pitch (α) and wherein said motor means (7) drive said forming roll (4) in rotation in a discontinuous manner for a circumferential arc corresponding to said angular pitch (α).

3. The forming machine (1) as in claim 1, wherein said forming machine comprises an appendix (16) associated with said partition (11) to cover said forming roll (4) between the angular loading position (8) to the angular unloading position (9) in the direction of rotation (R) of the roll (4) up to a distance capable of preventing the cavities from being exposed to the external air, at most up until the unloading position.

4. The forming machine (1) as in claim 1, wherein said forming roll (4) comprises an internal longitudinal channel (24) in correspondence with each of said rows of cavities (6) in communication with a plurality of branches (25) leading into the cavities (5) of the corresponding row (6), and wherein compressed air is supplied through the channel (24) of the row (6) of cavities (5) when the row (6) of cavities (5) is transiting through the angular unloading position (9).

5. The forming machine (1) as in claim 2, wherein said forming roll (4) comprises at least six of said rows (6) of cavities in the direction of rotation (R) of the roll (4), the angular loading position (8) of the cavities (5) being provided in correspondence with the apertures (12) of the partition (11), at least three transfer positions (17) along the partition (11) and a covering appendix (16), the angular unloading position (9) and at least the intermediate angular position (18) in correspondence with the flap (19).

6. The forming machine (1) as in claim 1, wherein said feed means (3) comprise a hopper (13) to load the stretched curd (F) in communication with the entrance ends of a plurality of feed screws (14), each of which has a corresponding exit end facing a corresponding aperture (12) of said partition (11).

7. The forming machine (1) as in claim 6, wherein said feed screws (14) are driven when the forming roll (4) is stationary, so as to allow the emptying of the row (6) of cavities positioned in correspondence with the angular loading position (8), said feed screws (14) being deactivated during the rotation of the roll (4).

\* \* \* \* \*